Dec. 7, 1943. C. G. ANDERSON 2,336,209
MEANS FOR DETERMINING THE QUANTITY OF AIR FLOWING THROUGH OUTLETS
Filed Dec. 15, 1941 2 Sheets-Sheet 1
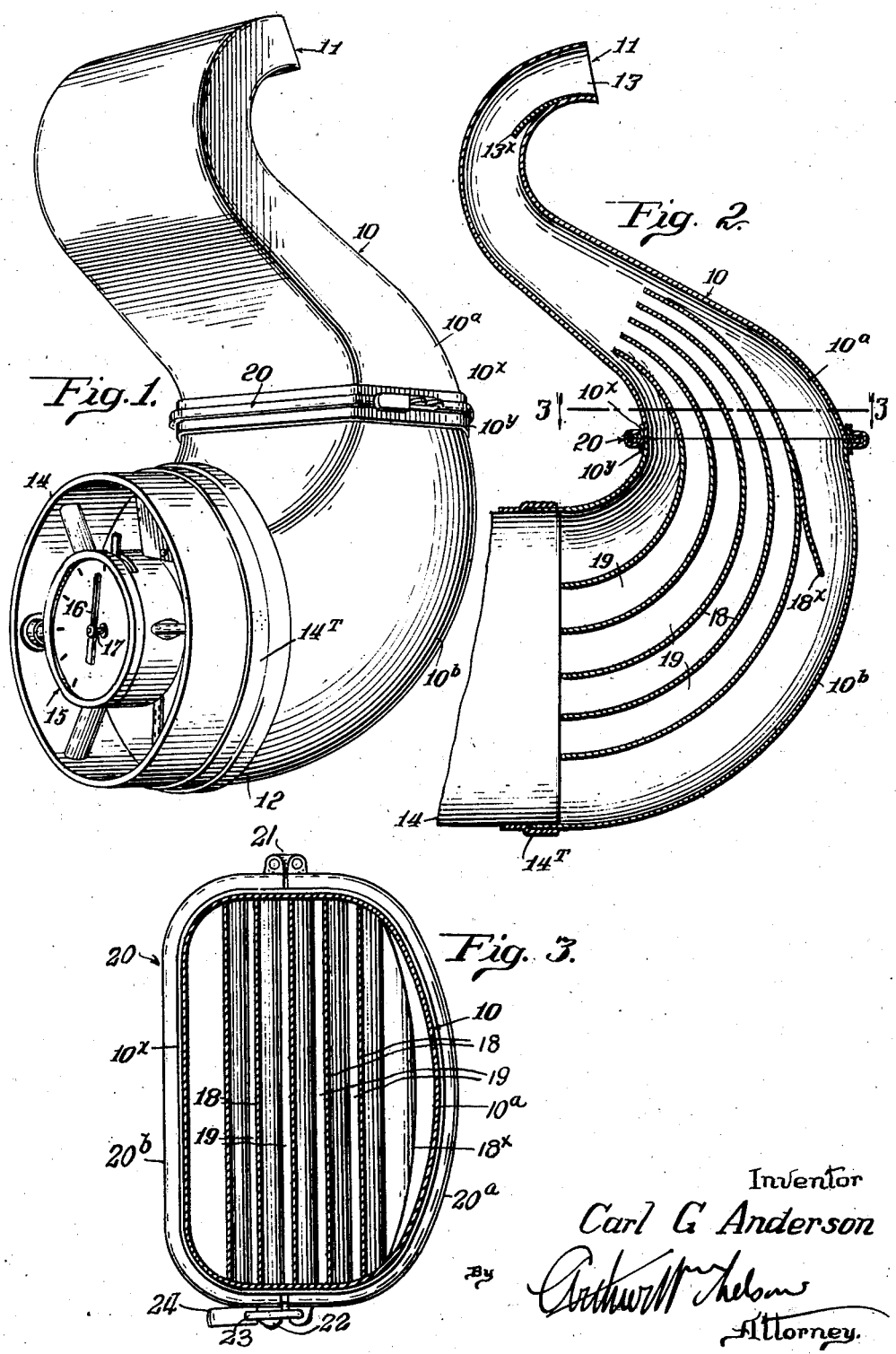
Inventor
Carl G Anderson
By
Attorney.

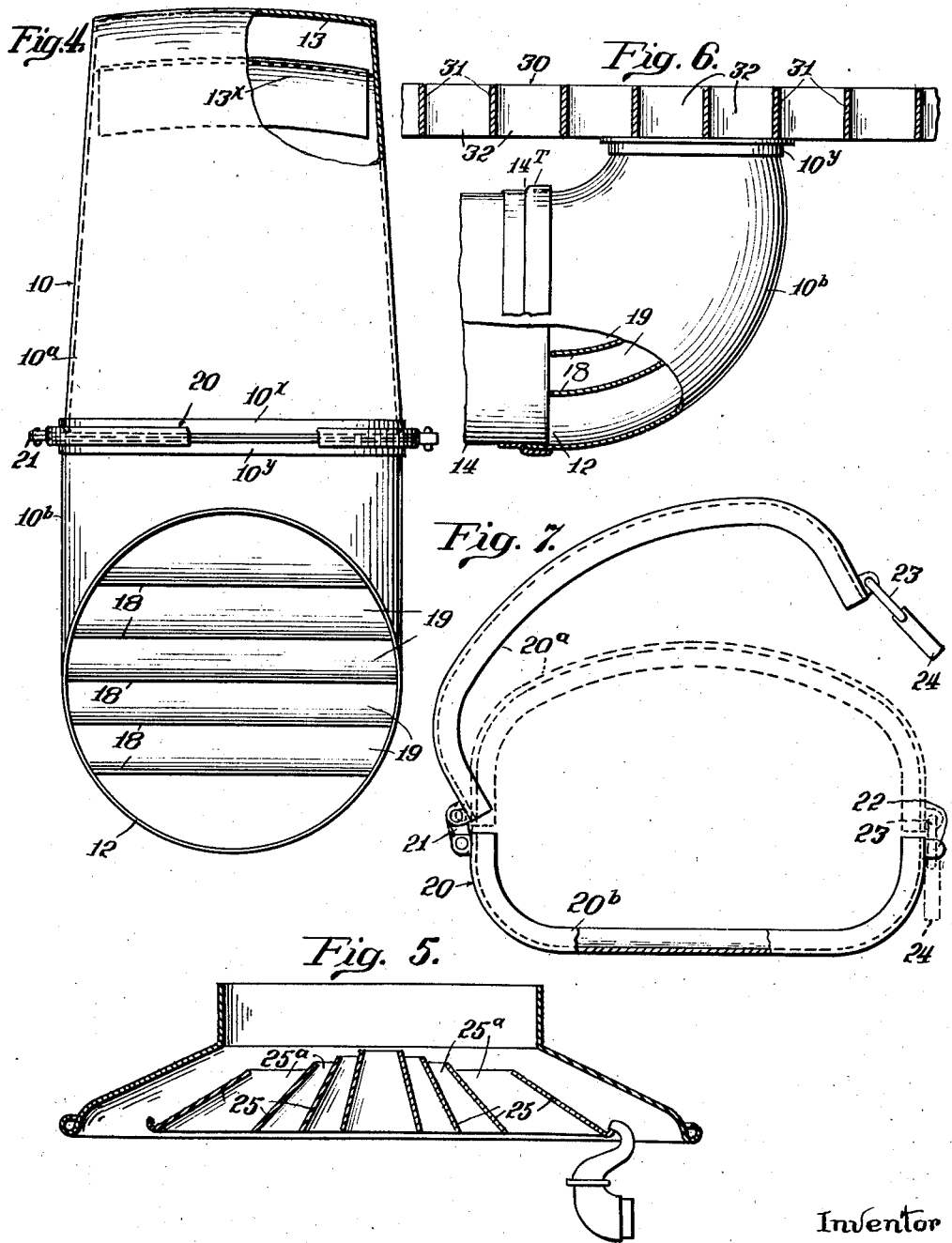

Patented Dec. 7, 1943

2,336,209

UNITED STATES PATENT OFFICE 2,336,209

MEANS FOR DETERMINING THE QUANTITY OF AIR FLOWING THROUGH OUTLETS

Carl G. Anderson, Chicago, Ill., assignor to Ventilating & Air Conditioning Contractors Association of Chicago, Chicago, Ill., a corporation of Illinois Application December 15, 1941, Serial No. 422,952

16 Claims. (Cl. 73—198)

This invention relates to improvements in means for determining the quantitly of air flowing through outlets and it consists of the matters hereinafter described and more particularly pointed out in the appended claims.

The means with which the present invention is concerned, are those especially adapted for use in connection with the outlet of a ventilating duct for measuring the air discharged therefrom.

In air conditioning and ventilating work, the usual practice is to provide ducts of suitable size and shape, through which air is moved, as by a blower, for a discharge through one or more outlets, frequently of the louvered type. The air ducts, which are generally made of sheet metal, are often concealed and vary widely in size, shape and design. However, such outlets usually include parts so shaped and positioned as to provide for the desired and equalized diffusion of the air at the outlet.

The health departments of various large cities require that certain definite amounts of air be discharged from the outlets per unit of time. Heretofore there has been no means of general application, permitting of an easy method of accurately determining the air discharged from or through outlets of a number of different types. When the duct is exposed in a room or other space, a hole with a removable cover has been provided in one wall of the duct. For testing purposes, the cover is removed and an air flow measuring means, such as an anemometer, is inserted into the duct in several different positions so as to get an average of the velocities obtaining at different points in the cross sectional area of the duct in the vicinity of the hole. Generally a standard 4" anemometer is employed in making the test mentioned.

Such a standard anemometer includes a finely balanced wheel, with a plurality of radial, angular vanes, which are surrounded by an annular protecting ring, the shaft of the wheel, through suitable gearing operating suitable hands which cooperate with dials, forming a part of the anemometer, to show the actual velocity. The anemometer is a delicate and expensive instrument, and may be easily damaged in making such tests, unless great care is taken.

The method above mentioned has certain objections in that it is necessary to provide a handhole in the duct which is an expense item. When the duct is a concealed duct, conditions are often such that testing is difficult. Again, all such a test discloses is the velocity of the air in the duct at a point removed from the outlet from which air flow can be calculated from the known area of the duct, whereas what is desired is the quantity of air actually discharged from the outlet.

One object of the invention is to provide simple and efficient means which may be used in connection with several different types of air duct outlets for accurately determining the quantity of the air discharged therefrom per unit of time.

Another object of the invention is to provide simple and efficient means which may be used in connection with several different sizes of a given type of air duct outlet for accurately determining the quantity of air discharged therefrom per unit of time.

A further object of the invention is to provide a means for this purpose which insures a better protection against damage to the anemometer forming a part thereof, when making the tests mentioned.

Also, it is an object of the invention to provide a means of this kind which includes parts which may be quickly separated and quickly reassembled to afford at least two different kinds of units for use in connection with air duct outlets of different types.

Again, it is a further object of the invention to provide a means of the kind mentioned which is so formed at one end that it may have a hanging support from a part of the louvered structure of an air duct outlet when making a test of said outlet.

It is also an object of the invention to provide a construction, in a device for the purpose mentioned, which will enable such devices to be made in quantity without the necessity of adhering to close tolerances and whereby they may be quickly and easily calibrated with respect to a similar device having known operating characteristics.

The above mentioned objects of the invention, as well as others, together with the advantages thereof will more fully appear as the specification proceeds.

In the drawings:

Fig. 1 is a perspective view of an air measuring means or device embodying the preferred form of the invention.

Fig. 2 is a longitudinal vertical sectional view through the same on substantially the same scale as that of Fig. 1.

Fig. 3 is a cross sectional view through a part of the improved means or device, on an enlarged scale, as taken on the line 3—3 of Fig. 2.

Fig. 4 is a view in front elevation of the device, when the anemometer has been removed therefrom and more particularly shows the disposition of certain equalizing vanes or partitions in the anemometer receiving end of the device.

Fig. 5 is a diagrammatic sectional view through one form of louvered air diffusing duct outlet showing the manner of using the improved means when making a test at said outlet.

Fig. 6 is a view similar to Fig. 5 but on an enlarged scale, showing the improved device in place when making a test in connection with an air duct outlet of the so-called flat surface type.

Fig. 7 is a plan view of a belt or ring forming a part of the device for holding the two parts of the body together in operative relation as will later appear.

In general, the improved means includes a tubular body which, when viewed from the side, is of substantially S shape and which increases in cross sectional area from its inlet end to its outlet end. The body is preferably made of thin sheet material and it is of such size that it may be conveniently held in the hand when positioning the same at different points about the outlet of a forced draft air duct when making a test of or at the outlet. The inlet end of the body has an inlet mouth of a width greater than its height and in use faces in substantially a horizontal direction. For illustrative and descriptive purposes it will be assumed that a ceiling outlet of an air duct is being tested. The outlet end of the S shaped body, which faces in a horizontal direction opposite that of the inlet mouth, is circular in shape and of such a diameter as snugly to receive one end of the casing ring of a standard 4" anemometer, used in connection with the body when making tests for the intended purpose. The body is provided interiorly of its outlet end with a plurality of longitudinally extending vanes or partitions which define gradually flaring channels for an even distribution of air over the face of the anemometer engaged in the outlet end of the body. The relative proportions of the different parts of the body will later appear.

In the present instance the body is divided transversely into two parts having matched meeting ends and with which is employed a clamping belt or ring for detachably holding said body parts together in body forming relation. Thus both parts of the body, as a unit, may be used for testing in connection with certain kinds of outlets. In testing outlets where the use of both parts as a unit is impractical, the belt or ring is removed to permit a separation of the parts, thus making available for use that part of the body carrying the anemometer.

Referring now in detail to that embodiment of the invention illustrated in the drawings, 10 indicates as a whole the tubular body of the device, preferably made of thin sheet metal such as copper or steel. The body, when viewed from one side is of substantially S or double curved shape and it gradually flares or increases in cross sectional area from its inlet end 11, which faces in one direction, to its outlet end 12, which faces in the other direction. The inlet end of the body, has a substantially semi-circular hook shape when viewed as in Fig. 2 and is formed to present an inlet mouth 13 of generally a rectangular cross section, wider than it is high, and having a slight downward curvature toward its two sides as best appears in Fig. 4.

In practice the outlet end of the body, which as before mentioned is circular, has an inside diameter of about 4" so as to receive one end of the casing ring 14 of a standard 4" anemometer 15, with a very snug fit. In order positively to preclude the passage of air between the outlet end of the body and the casing ring, a piece of tape 14T may be used. I find that an inlet mouth about 3½" wide inside and 0.65" high inside and providing an area of about 2.275 square inches, is practical for use in connection with the outlet mentioned. With such dimensions, the inlet mouth has an area of about 17% of that of the outlet and the face of the anemometer used therewith. In height, the bottom of the inlet mouth is spaced about 7½" from the axis or center of the outlet.

The anemometer, which best appears in Fig. 1, includes suitable indicating mechanism 16 driven from a shaft 17 having a vaned impeller disposed within the casing ring and surrounding the indicating mechanism as best shown in said figure. It is pointed out that while the casing ring has a snug frictional fit in the outlet end of the body, it may be removed therefrom and replaced therein without the aid of any tools after removing the tape 14T. When moving air passes through the annular space of the anemometer, as provided between the casing ring and the indicating mechanism, and in which space the vanes of the impeller are disposed, said moving air causes rotation of the impeller which through suitable gearing (not shown) drives the indicating mechanism to provide a reading thereon.

In the outlet end of the body is provided a plurality of longitudinally extending partitions 18 which follow generally the curved formation of the associated end of the body to produce therein a plurality of gradually flaring or widening channels 19. Said partitions and channels terminate at one end in a plane which corresponds to that of the inner edge of the casing ring 14 of the anemometer when the same is positioned in the outlet end of the body. These partitions divide the air stream passing through the body into a plurality of parts which follow the channels for a more uniform distribution of said air stream in directing it into the annular space of the anemometer. This action also prevents a blocking or trapping of a part of the air stream at some point along the outlet end of the body and where it would produce a turbulence which would affect the accuracy of the indicating mechanism of the anemometer. The end edges of the vanes facing toward the inlet mouth are so formed cross sectionally so as to prevent an undue turbulence to the air entering the channels 19.

Preferably the body is made in a plurality of separable parts, in this instance two, as shown and which bear the reference numerals 10a and 10b respectively. The line of juncture of said parts, which also passes through the vanes or partitions 18, is disposed at about a right angle to the plane of the outlet end of the body and about 3" from the axis or center of said outlet end. The meeting ends of both body parts, of course, match with each other and said meeting ends are provided with outwardly extending flanges 10x and 10y respectively, best appearing in Fig. 2. These flanges, when engaged with one another, are surrounded and enclosed by a removable clamping belt or ring 20 of a channel shape in cross section, which best appears in Fig. 7. This belt or ring includes two parts 20a and 20b that are pivotally connected together at one end as at 21. The part 20b is formed at its free end with a shoulder lug 22. The part 20a of said belt or ring is provided at its free end with a pivoted link 23 and a cam like lever 24, the lever being adapted for engagement with the lug and then capable of being swung into a locked position. In this position the free ends of the belt or ring parts 20a—20b are drawn toward each other and secured in position so that the ring as a whole clamps the two parts 10a and 10b of the casing together in a substantially air-tight operative condition.

In Fig. 5 I have shown a vertical sectional view through one form of ceiling outlet having a plurality of annular louvers or vanes 25 defining air outlet channels 25a therebetween. In this instance the louvers or vanes have such a cross section so as to diffuse the air streams issuing from said channels. To test such an outlet, the device comprising the two body parts 10a and 10b, secured together by the ring 20, is employed, it being understood that the anemometer is disposed in the outlet end of the casing part 10b as before mentioned. The inlet end 11 of the device above mentioned is then disposed at one point in a channel 25a of the ceiling outlet. Due to the shape of said end, said device is supported in placing by hooking the inlet end 11 of the casing part 10a, over the rim of one of the louvers or vanes and from which it will hang in a position disposing the face of the anemometer in a perpendicular plane for easy reading. Due to the transversely curved formation of the inlet end, it will engage with a two-point contact upon the rim of the louver upon which it hangs. Thus the device will not "rock" transversely when so hung upon said vane. The device is left in this position for a definite period of time, say five seconds, which is sufficient to provide a proper indication by and a reading of the anemometer. The device is then moved to another position in said channel to there remain for another period of five seconds. If the person making the test spends one minute to provide twelve readings of five seconds each, so as to make a reading every 30°, good testing results are obtained. Multiplying the air velocity per unit of time, as indicated by the anemometer, by a previously found constant K will accurately give the quantity of air flowing through the outlet in cubic feet for the same period. The constant K only applies to a given size of a given outlet so that each outlet size and each outlet form would be tested to find the applicable constant. To find the constant, in the first instance, the device is applied to a given outlet from which a known quantity of air discharges per unit of time, which quantity is divided by the velocity reading of the anemometer carried by the device.

In Fig. 6, I have illustrated, in cross section, a flat face grill type of outlet 30, the face of the outlet being formed by sets of spaced apart intersecting strips 31 defining a plurality of outlet passages 32. The passages 32 are too small to permit the introduction of the inlet end 11 of the casing 10 into said passages. Therefore, the cam lever 24 of the belt or ring 20 is actuated to open said ring for a removal thereof at the flanges 10x—10y of the body parts 10a—10b so as to permit a separation thereof.

Only the body part 10b which carries the anemometer is used in making the test upon the flat type outlet and in so making the test, that end of said body part defined by the flange 10y is placed flatwise against the edges of the strips 31 in a part of the area of said outlet. In this instance, the body part 10b is held in the hand of the person making the test. After holding the device in one position, say for five seconds, it is then moved to other positions, to remain in each position for say five seconds. In this respect it is pointed out that the body part 10b functions as a protective holder for the anemometer.

In either instance the partitions 18 act to evenly distribute the air passing through the device to the anemometer and this is so whether the device is in the condition shown in Fig. 5 or in Fig. 6.

In the drawings, and as best shown in Fig. 2, will be found parts 13x and 18x, which have not heretofore been described. It is not necessary that such parts be used, as the device is usable without these parts. However, if one device were completed and the constant K found with respect thereto, it would require extremely fine workmanship to duplicate such a device so accurately that it could be used with the same constant found applicable to the similar instrument previously tested. Since it is an object of the invention to provide a construction which can be made in quantities without the necessity of adhering to extremely close tolerances, it was necessary to find means whereby such instruments could be readily made to function exactly like the master instrument without the necessity of again making all the tests originally necessary to find the constant K. To this end the device as a whole, i. e., the two parts, are intentionally made oversize with respect to the master device. That is to say, the device is oversize before the parts 13x and 18x are applied. Knowing that the device is definitely oversize, it is only necessary to provide means which enable the parts to be brought down to the proper size characteristics, which is the function of the parts 13x and 18x.

The part 13x (see Figs. 2 and 4) is in the nature of a tongue. It is fixed to the one wall adjacent the mouth and extends away from the mouth in the direction of the air stream. The tongue 13x preferably extends substantially from side wall to side wall, but is not attached to said side walls. It is made of bendable metal having such characteristics that it will remain in any placed position, but will not be substantially displaced by the movement of the air through the device. Preferably the tongue extends at such an angle to the associated wall of the device that it initially reduces the effective cross sectional area adjacent the mouth end of the device below the desired cross sectional area. The manner of calibrating the device will be described shortly.

On the outermost face of one of the vanes 18 disposed in the body part 10b, near the line of juncture before mentioned, I secure a tongue 18x (see Figs. 2 and 3). The free end of the tongue 18x extends away from said line of juncture and in the direction of the air flow through the body. It is also made of bendable metal and may be reached from the top end of the body part, when the same is separated from the body part 10a, so that the free end of the tongue can be bent or deformed into the desired position. Preferably as with the tongue 13x, the tongue 18x is initially affixed in such position that the effective cross sectional area of the body part in which it is placed is less than that required.

In order to calibrate the instrument or device with respect to a master or previously tested device, the following practice may be followed. The body of the instrument to be calibrated is separated into its two parts. The outlet body part 10b is associated with an air duct outlet in the manner previously described and the reading on the anemometer noted. Since the tongue 18x has unduly restricted the flow of air, it is obvious that the anemometer will show a reading which will be less than that shown by the body part 10b of the master or previously tested instrument. The free end of the tongue is then bent slightly toward the wall member to which its fixed end is secured. Then the part 10b is again placed at the outlet and the reading on the anemometer noted. If the reading does not then correspond with the reading given by the anemometer carried by the part 10b of the master instrument, then the tongue member 13x is bent again until the reading of both anemometers is the same. It is then known that parts 10b of both instruments are functionally identical. Thereafter the body inlet end 18a is secured to the body outlet end 10b and a test of the whole device may be made as previously described, without reference to the parts 13x and 18x. Since it is now known that the parts 10b of the master instrument and the instrument being calibrated are functionally identical, if there is a difference in the reading, it must be because the body inlet parts 10a of the two instruments are not functionally identical. Hence, it is but necessary to bend the tongue 13x to such position that the reading of the anemometers on both instruments corresponds.

It is evident that with the construction described, the device may be made in quantities without the necessity of working to close tolerances and that thereafter each device can be quickly and easily calibrated so that all will function in an identical manner and like a master or previously tested device.

While in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. A device of the kind described embodying therein a relatively elongated substantially S shaped tubular body having an inlet end and an outlet end, said body increasing in cross sectional area from its inlet end to its outlet end which is adapted to operatively receive an anemometer, and means in the outlet end of the body for uniformly distributing the air passing through the outlet end of the body over said anemometer.

2. A device of the kind described embodying therein a relatively elongated substantially S shaped tubular body having an inlet end and an outlet end, the inlet end of the body having a laterally elongated substantially rectangular inlet mouth of one cross sectional area and the outlet end of said body being substantially of a circular shape of a greater cross sectional area and being adapted to operatively receive an anemometer.

3. A device of the kind described embodying therein a relatively elongated substantially S shaped tubular body having an inlet end and an outlet end, the inlet end of the body having a laterally elongated substantially rectangular inlet mouth of one cross sectional area and the outlet end of said body being substantially of a circular shape of a greater cross sectional area and being adapted to operatively receive an anemometer, and means in the outlet end of the body for uniformly distributing the air passing through the outlet end of the body over said anemometer.

4. A device of the kind described embodying therein a relatively elongated substantially S shaped tubular body having an inlet end and an outlet end, the inlet end of the body having a laterally elongated substantially rectangular inlet mouth of one cross sectional area and the outlet end of said body being substantially of a circular shape of a greater cross sectional area and being adapted to operatively receive an anemometer, and a plurality of partitions extending longitudinally of the outlet end of the body and defining flaring channels therebetween for uniformly distributing the air passing through the outlet end of the body over said anemometer.

5. A device of the kind described embodying therein a relatively elongated substantially S shaped tubular body having an inlet end and an outlet end, said body increasing in cross sectional area from the inlet end to the outlet end, which is adapted to operatively receive an anemometer, said body being split transversely at least at one point to form separable parts having matching meeting ends, means operable to detachably join said meeting ends together in substantially an air tight relationship, and air diffusing means in the outlet end of the body.

6. A device of the kind described embodying therein a relatively elongated substantially S shaped tubular body having an inlet end and an outlet end, said body increasing in cross sectional area from the inlet end to the outlet end, which is adapted to operatively receive an anemometer, said body being split transversely at least at one point to form separable parts having matching meeting ends, each with an outwardly extending flange and a ring-like element surrounding the flanges of said meeting ends for holding said parts together in substantially an air tight relationship.

7. A device of the kind described embodying therein a relatively elongated tubular body having an air inlet end and an air outlet end, said body being formed to increase in cross sectional area from the inlet end to the outlet end, the inlet end being adapted for association with the outlet of a forced draft air duct so that a part of the forced draft air passes thereinto and through the body, air flow measuring means disposed in operative relation with respect to the outlet end of the tubular body, a plurality of vanes disposed generally in the outlet end of the body for uniformly distributing the forced draft air passing therethrough about said measuring means, and means disposed in a part of the body and carried by one of said vanes and adjustable to vary the effective cross sectional area of said part of the body.

8. A device of the kind described embodying therein a relatively elongated tubular body having an air inlet end and an air outlet end, said body being formed to increase in cross sectional area from the inlet end to the outlet end, the inlet end being adapted for association with the outlet of a forced draft air duct so that a part of the forced draft air passes thereinto and through the body, air flow measuring means disposed in operative relation with respect to the outlet end of the tubular body, a plurality of vanes disposed generally in the outlet end of the body for uniformly distributing the forced draft air passing therethrough about said measuring means, and means disposed in that part of the body which carries said vanes and which means is adjustable to vary the effective cross sectional area of said part of the body.

9. A device of the kind described embodying therein a relatively elongated substantially S shaped tubular body having an inlet end and an outlet end, the inlet end of the body having a laterally elongated, substantially rectangular inlet mouth of one cross sectional area, means adjacent said mouth and deformable to vary the effective cross sectional area adjacent said mouth, the outlet end of said body being of a greater cross sectional area and formed to receive an anemometer, a plurality of vanes disposed in the outlet end of the body and dividing the same into passageways for uniformly distributing the air passing through the outlet end of the body over the anemometer, and means secured to one of said vanes and extending into one passageway and deformable to change the effective cross sectional area of said passageway.

10. A device of the kind described embodying therein a relatively elongated substantially S shaped tubular body having an inlet end and an outlet end, the inlet end of the body having a laterally elongated, substantially rectangular inlet mouth of one cross sectional area, means adjacent said mouth and deformable to vary the effective cross sectional area adjacent said mouth, the outlet end of said body being of a greater cross sectional area and formed to receive an anemometer, a plurality of vanes disposed in the outlet end of the body and dividing the same into passageways for uniformly distributing the air passing through the outlet end of the body over the anemometer, and means disposed in that part of the body which carries the vanes, extending into at least one passageway and being deformable to change the effective cross sectional area of said passageway.

11. A device of the kind described embodying therein a relatively elongated tubular body having an air inlet end and an air outlet end, the body increasing in cross sectional area from a point adjacent the inlet end to the outlet end, the inlet end being offset axially from the outlet end and being formed to engage a part of the outlet of a forced draft air duct for the hanging support of the device therefrom while a part of the forced draft air passes thereinto and through the body, the outlet end of the body being formed to receive the casing ring of an anemometer.

12. A device of the kind described embodying therein a relatively elongated tubular body having an air inlet end and an air outlet end, the body increasing in cross sectional area from a point adjacent the inlet end to the outlet end, the inlet end being offset axially from the outlet end and being formed to engage a part of the outlet of a forced draft air duct for the hanging support of the device therefrom while a part of the forced draft air passes thereinto and through the body, air flow measuring means disposed in operative relation with respect to and supported by the outlet end of the tubular body, and means in the outlet end of said tubular body for uniformly distributing the forced draft air passing therethrough about said air flow measuring means.

13. A device of the kind described embodying therein a generally upright elongated tubular body having an air inlet end and an air outlet end axially offset from and spaced below said inlet end, said inlet end being relatively wide horizontally and relatively narrow vertically, having a predetermined area and being adapted for association with the outlet of a forced draft air duct so that a part of the forced draft air enters said inlet end and passes through the body and out through the outlet end, said body changing in cross sectional shape and area from a point adjacent said inlet end to said outlet end which has a larger area than said inlet end, said outlet end being circular so as to receive an air flow measuring means.

14. A device of the kind described embodying therein a generally upright elongated tubular body having an air inlet end and an air outlet end axially offset from and spaced below said inlet end, said inlet end being relatively wide horizontally and relatively narrow vertically, having a predetermined area and being adapted for association with the outlet of a forced draft air duct so that a part of the forced draft air enters said inlet end and passes through the body and out through the outlet end, said body changing in cross sectional shape and area from a point adjacent said inlet end to said outlet end which has a larger area than said inlet end, said outlet end being circular so as to receive an air flow measuring means, and means in the outlet end of the body for uniformly distributing the forced draft air passing therethrough about said air flow measuring means.

15. A device of the kind described embodying therein a plurality of tubular body parts each having an inlet end and an outlet end, the outlet end of one body part matching the inlet end of the other body part, the outlet end of said other body part being adapted to receive and support an air flow measuring means, said body parts when said matching ends are engaged with each other conjointly forming a substantially S shaped tubular body for the device that flares and increases in cross sectional area from a point adjacent one end to the other, means for detachably and separably securing said matching ends of said body parts in operative relation to form said substantially S shaped body for the device, the inlet end for the first mentioned body part forming the air inlet end for said S shaped body for association with the outlet of a forced draft air duct, the inlet end of said other of said body parts when they are separated being adapted to form the air inlet end for said other of said body parts for association with said outlet of said forced draft air duct.

16. A device of the kind described embodying therein a plurality of tubular body parts each having an inlet end and an outlet end, the outlet end of one body part matching the inlet end of the other body part, the outlet end of one of said body parts being adapted to receive and support an air flow measuring means, said body parts when said matching ends are engaged with each other conjointly forming a substantially S shaped tubular body for the device that flares and increases in cross sectional area from a point adjacent one end to the other, means for detachably and separably securing said matching ends of said body parts in operative relation to form said substantially S shaped body for the device, the inlet end for the first mentioned body part forming the air inlet end for said S shaped body for association with the outlet of a forced draft air duct, the inlet end of said other of said body parts when they are separated being adapted to form the air inlet end for said other of said body parts for association with said outlet of said forced draft air duct, and a plurality of partitions extending longitudinally of said other of said body parts and defining flaring channels therein for uniformly distributing the air passing therethrough about said air flow measuring means.

CARL G. ANDERSON.